United States Patent
Yin et al.

(10) Patent No.: US 12,361,518 B2
(45) Date of Patent: Jul. 15, 2025

(54) IMAGE RECOGNITION METHOD AND DEVICE, AND COMPUTER-READABLE STORAGE MEDIUM

(71) Applicant: INSPUR SUZHOU INTELLIGENT TECHNOLOGY CO., LTD., Jiangsu (CN)

(72) Inventors: Wenfeng Yin, Jiangsu (CN); Gang Dong, Jiangsu (CN); Yaqian Zhao, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 278 days.

(21) Appl. No.: 18/011,512

(22) PCT Filed: Apr. 26, 2021

(86) PCT No.: PCT/CN2021/089861
§ 371 (c)(1),
(2) Date: Dec. 19, 2022

(87) PCT Pub. No.: WO2022/057262
PCT Pub. Date: Mar. 24, 2022

(65) Prior Publication Data
US 2023/0334632 A1    Oct. 19, 2023

(30) Foreign Application Priority Data
Sep. 17, 2020 (CN) .......................... 202010980176.3

(51) Int. Cl.
*G06T 5/20* (2006.01)
*G06V 10/771* (2022.01)
*G06V 10/82* (2022.01)

(52) U.S. Cl.
CPC .............. *G06T 5/20* (2013.01); *G06V 10/771* (2022.01); *G06V 10/82* (2022.01)

(58) Field of Classification Search
CPC ........ G06T 5/20; G06V 10/771; G06V 10/82; G06V 10/454; G06F 18/2415;
(Continued)

(56) References Cited

U.S. PATENT DOCUMENTS 9,767,381 B2 * 9/2017 Rodríguez-Serrano ..................... G06N 3/04
11,321,609 B2 * 5/2022 Choi ........ G06F 17/16
(Continued)

FOREIGN PATENT DOCUMENTS

| CN | 107680044 A | 2/2018 |
|---|---|---|
| CN | 109978142 | * 7/2019 |

(Continued)

OTHER PUBLICATIONS

F. Tung and G. Mori, "CLIP-Q: Deep Network Compression Learning by In-parallel Pruning-Quantization," 2018 IEEE/CVF Conference on Computer Vision and Pattern Recognition, Salt Lake City, UT, USA, 2018, pp. 7873-7882, doi: 10.1109/CVPR.2018.00821. (Year: 2018).*

(Continued)

*Primary Examiner* — Andrae S Allison
(74) *Attorney, Agent, or Firm* — IPro, PLLC (57) ABSTRACT

An image recognition method includes: inputting a sample image data set into an original neural network model in advance; and for each convolution layer of the original neural network model, using a feature map of the sample image data set in the current layer as a reconstruction target, firstly obtaining an update weight of a convolution kernel by using a kernel set construction method, then calculating an input channel combination having a minimum reconstruc-
(Continued)

tion error, cutting a redundant input channel to obtain a compression result of the current convolution layer, and finally, splicing compression results of the convolution layers to generate an image recognition model. An image to be recognized is obtained and is inputted into the image recognition model, and an output result of the image recognition model is used as an image recognition result of the image.

17 Claims, 3 Drawing Sheets

(58) Field of Classification Search
CPC ...... G06F 18/214; G06N 3/045; G06N 3/047; G06N 3/082
See application file for complete search history.

(56) References Cited

U.S. PATENT DOCUMENTS

| | | | |
|---|---|---|---|
| 2015/0100529 A1 | 4/2015 | Sarah et al. | |
| 2018/0082181 A1* | 3/2018 | Brothers | G06N 3/045 |
| 2018/0373975 A1* | 12/2018 | Yu | G06N 3/08 |
| 2018/0373978 A1* | 12/2018 | Yu | G06F 17/11 |
| 2019/0180184 A1* | 6/2019 | Deng | G06N 3/045 |
| 2019/0228311 A1* | 7/2019 | Sarah | G06N 3/04 |
| 2020/0082268 A1* | 3/2020 | Chiu | G06N 3/048 |
| 2021/0142175 A1* | 5/2021 | Fiandrotti | G06N 3/084 |
| 2021/0158166 A1* | 5/2021 | Azarian Yazdi | G06N 3/048 |
| 2023/0004809 A1* | 1/2023 | Guo | G06N 3/0495 |

FOREIGN PATENT DOCUMENTS

| | | |
|---|---|---|
| CN | 109978142 A | 7/2019 |
| CN | 112116001 A | 12/2020 |

OTHER PUBLICATIONS

S. Vadera and S. Ameen, "Methods for Pruning Deep Neural Networks," in IEEE Access, vol. 10, pp. 63280-63300, 2022, doi: 10.1109/ACCESS.2022.3182659. (Year: 2022).*

Zou, Junhua, et al. "Convolutional neural network simplification via feature map pruning." Computers & Electrical Engineering 70 ( 2018): 950-958. (Year: 2018).*

PCT/CN2021/089861 international search report.

* cited by examiner

FIG. 1

FIG. 2 input a sample image data set into an original neural network model; for each convolution layer of the original neural network model, by taking a feature map of the sample image data set at the current layer as a reconstruction target and using a kernel set construction method, first acquire updated weight values of a convolution kernel, then calculate an input channel combination with a minimum reconstruction error and clip redundant input channels, which serve as a compression result of the current layer, and splice the compression result of each convolution layer to generate an image recognition model ~S301 input an acquired image to be recognized into the image recognition model to obtain an image recognition result of the image to be recognized ~S302

IMAGE RECOGNITION METHOD AND DEVICE, AND COMPUTER-READABLE STORAGE MEDIUM

The present disclosure claims the priority of the Chinese patent application filed on Sep. 17, 2020 before the CNIPA, China National Intellectual Property Administration with the application number of 202010980176.3 and the title of "IMAGE RECOGNITION METHOD AND DEVICE, AND COMPUTER-READABLE STORAGE MEDIUM", which is incorporated herein in its entirety by reference.

FIELD

The present disclosure relates to the technical field of image processing, and particularly relates to an image recognition method and device, and a computer-readable storage medium.

BACKGROUND

With the rapid development of artificial intelligence technologies, machine vision, as a branch of artificial intelligence, has also been developed. In short, machine vision means measurement and determination with a machine instead of human eyes. Machine vision products, i.e., image capturing devices such as a complementary metal oxide semiconductor (CMOS) and a Charge-coupled Device (CCD), are used to convert captured targets into image signals and transmit the image signals to dedicated image processing systems to obtain the morphological information of the captured targets, and the image signals are converted into digitized signals according to information such as pixel distribution, brightness, and color; an image system performs various operations on these signals to extract features of the targets, and then controls on-site apparatus actions according to determination results. Thus, it shows that a large part of the work of machine vision in the process of realization is image processing, and the recognition accuracy and efficiency of the image capturing device for capturing the images have a great impact on the performance of machine vision.

In related art, artificial neural network models are usually used to perform image classification and recognition tasks, while depth neural network parameters applied to image classification and recognition tasks have very great redundancy, therefore, during performing the image classification and classification tasks, a lot of calculation resources are consumed, and the efficiency of image recognition is not high.

In view of this, how to improve the efficiency of image recognition and reduce the calculation resources consumed in the process of image recognition is a technical problem to be solved by a person skilled in the art.

SUMMARY

The present disclosure provides an image recognition method and device, and a computer-readable storage medium, which effectively improve the efficiency of image recognition and reduce calculation resources consumed in the process of image recognition.

In order to solve the above technical problems, the present disclosure provides the following technical solutions:

in an aspect of the embodiments of the present disclosure, an image recognition method is provided, including:

inputting a sample image data set into an original neural network model in advance; for each convolution layer of the original neural network model, by taking a feature map of the sample image data set at a current layer as a reconstruction target and using a kernel set construction method, first acquiring updated weight values of a convolution kernel, then calculating an input channel combination with a minimum reconstruction error and clipping redundant input channels, which serve as a compression result of the current layer; splicing the compression result of each convolution layer to generate an image recognition model; and inputting an acquired image to be recognized into the image recognition model to obtain an image recognition result of the image to be recognized.

In some embodiments of the present disclosure, the by taking a feature map of the sample image data set at the current layer as a reconstruction target and using a kernel set construction method, first acquiring updated weight values of a convolution kernel includes:

determining importance of each input channel of the current layer according to a feature map of each sample data in the sample image data set at each input channel of the current layer;

setting an importance weighting coefficient for each input channel according to the importance of each input channel;

determining a sampling probability of each input channel by calculating a weighted importance function of each input channel and a sum function;

performing multiple rounds of sampling on a corresponding input channel according to the sampling probability of each input channel, performing multiple sampling on an input channel set of the current layer per round according to the sampling probability to obtain a kernel set, calculating and accumulating feature map reconstruction errors corresponding to a channel kernel set, and obtaining an updated value of a convolution kernel weight of the current layer by calculating an optimization function that minimizes feature map reconstruction errors.

In some embodiments of the present disclosure, the determining a sampling probability of each input channel by calculating a weighted importance function of each input channel and a sum function includes:

invoking a pre-stored importance function relationship formula to calculate the weighted importance function of each input channel, and the importance function relationship formula is:

$$s_i(x) = w_i(x) \cdot g_i(x)$$

the sampling probability $p_i$ of an i-th input channel is expressed as $p_i = s_i(x)/t$;

where $s_i(x)$ represents the weighted importance function of the i-th input channel, $w_i(x)$ represents the importance weighting coefficient of the i-th input channel, and $g_i(x)$ represents an initial importance function of the i-th input channel;

$$g_i(x) = \max_{x \in X}(\|x_i\|_F^2) / \frac{1}{m_{l-1}} \sum_{l=1}^{m_{l-1}} \max_{x \in X}(\|x_i\|_F^2),$$

$$w_i(x) = \begin{cases} 1/(a_l + 1), & i \leq a_l \\ 1/(a_l + 1)(m_{l-1} - a_l), & a_l \leq i \leq m_{l-1} \end{cases},$$

-continued $$\sum_{i=1}^{m_{l-1}} w_i(x) = 1, \text{ where } \max_{x \in X} \|x_i\|_F^2$$

represents a maximum value of Frobenius norms of the feature map $x_i$ of each sample data in the sample image data set X in the i-th input channel, $m_{l-1}$ represents a total number of output channels of a (l−1)-th convolution layer of the original neural network model, $$\frac{1}{m_{l-1}} \sum_{i=1}^{m_{l-1}} \max_{x \in X}(\|x_i\|_F^2)$$

represents a mean value of the maximum values of the Frobenius norms of the feature maps of all the input channels, $a_l$ represents a number of compressed input channels to be achieved by a l-th convolution layer target of the original neural network model, and t represents the sum function; and $t = \sum_{i=1}^{m_{l-1}} s_i(x)$.

In some embodiments of the present disclosure, the obtaining an updated value of a convolution kernel weight of the current layer by calculating an optimization function that minimizes feature map reconstruction errors includes:
invoking a pre-stored weight value updating relationship formula to obtain the updated value of the convolution kernel weight of the current layer, and the weight value updating relationship formula is expressed as:

$$\min \sum_{k=1}^{K} \frac{1}{R} \sum_{r=1}^{R} \left\| Y_k - \sum_{x_t \in S} x_t * W_{ik}^* \right\|_F^2$$

where $Y_k$ represents an output feature map of an uncompressed convolution kernel at a k-th output channel, K represents a total number of the output channels of the convolution kernel of the current layer, $\sum_{k=1}^{K}(\cdot)$ represents a respective calculation of feature map reconstruction errors for the K output channels of the convolution kernel and a summarization of the errors; $\sum_{r=1}^{R}(\cdot)$ represents R rounds of independent sampling of the input channel combination of the input sample image data set and an accumulation of the feature map reconstruction errors of each sampling result, $\|\cdot\|_F^2$ represents the Frobenius norm, $W_{ik}^*$ represents an updated value of a weight tensor of the convolution kernel of the current layer at the i-th input channel and the k-th output channel, and serves as a solution target of the convolution kernel weight value estimation operation based on the kernel set, S represents a kernel set composed of a input channels sampled from C input channels inputting the sample image data set; $\sum_{x_i \in S} x_i * W_{ik}^*$ represents the sum of output feature maps of feature maps $x_i$ of all input channels in the kernel set S at an output channel corresponding to the convolution kernel; and * represents a convolution operation.

In some embodiments of the present disclosure, the calculating an input channel combination with a minimum reconstruction error and clipping redundant input channels includes:
determining a probability that each input channel of the current layer is selected according to the updated weight value of the convolution kernel of the current layer, and forming the probability that each input channel is selected into a hit probability set;

calculating the input channel combination with the minimum output feature map reconstruction error based on the hit probability set, and removing non-selected input channels according to the input channel combination; and calculating an output feature map of the compressed convolution kernel, using a convolution result of the compressed convolution kernel of the current layer and the sample image data set as input data of a next convolution layer of the current layer.

In some embodiments of the present disclosure, the calculating the input channel combination with the minimum output feature map reconstruction error based on the hit probability set includes:
invoking a pre-stored optimization function relationship formula to calculate an input channel combination $\gamma$ with the minimum output feature map reconstruction error, and the optimization function relationship formula is expressed as:

$$\arg\min_{\gamma} \left\| Y - \sum_{k=1}^{K} \sum_{i=1}^{C} \gamma_i X_i W_{ik}^* \right\|_F^2 + (1-q)\gamma$$

where Y represents the output feature map of the original neural network model at the current layer, K represents a total number of the output channels of the convolution kernel at the current layer, $\gamma_i$ represents whether an i-th channel is selected, the value of $\gamma_i$ is 0 or 1, $\gamma = \{\gamma_i | 1 \leq i \leq C\}$ represents the best sampling result of a input channels sampled from C input channels, and satisfies the condition $\|\gamma\|_0 = a$, and $X_i$ represents the feature map of the sample image data set at an i-th input channel of the current layer; $W_{ik}^*$ represents an updated value of a weight tensor of the convolution kernel of the current layer at the i-th input channel and a k-th output channel; $\|\cdot\|_F^2$ represents a Frobenius norm; $(1-q)\gamma$ represents the addition of a vector constructed by the sampling probability of each input channel as a penalty factor to a penalty term in an optimization objective function; and q represents the hit probability set.

In some embodiments of the present disclosure, the determining the probability that each input channel of the current layer is selected according to the updated weight value of the convolution kernel of the current layer includes:
invoking a pre-stored selection probability relationship formula to calculate the probability that each input channel at the current layer is selected, and the selection probability relationship formula is expressed as:

$$q_i = (w_i(x) \cdot f_i(x)) / \sum_{i=1}^{m_{l-1}} (w_i(x) \cdot f_i(x))$$

where $$f_i(x) = \max_{x \in X} \left( \left\| x_i * \sum_{k=1}^{K} W_{ik}^* \right\|_F^2 \right) / \frac{1}{n_l} \sum_{i=1}^{n_l} \max_{x \in X} \left( \left\| x_i * \sum_{k=1}^{K} W_{ik}^* \right\|_F^2 \right);$$

$w_i(x)$ represents an importance weighting coefficient of an i-th input channel; $m_{l-1}$ represents total numbers of output channels of a (l−1)-th convolution layer of the original neural network model; X represents the sample image data set; $x_i$ represents the feature map of each sample data in the sample image data set in the i-th input channel; K represents the total number of the output channels of the convolution kernel of the current layer; $W_{ik}^*$ represents an updated value of a weight tensor of the convolution kernel of the current layer in the i-th input channel and a k-th output channel; $\|\cdot\|_F^2$ represents a Frobenius norm; and $n_l$ represents a total number of the input channels of the original neural network model in a l-th layer.

In another aspect of the embodiments of the present disclosure, an image recognition device is provided, including:

a neural network model compression module, configured to input a sample image data set into an original neural network model, for each convolution layer of the original neural network model, by taking a feature map of the sample image data set at a current layer as a reconstruction target and using a kernel set construction method, first acquire updated weight values of a convolution kernel, then calculate an input channel combination with a minimum reconstruction error and clip redundant input channels, which serve as a compression result of the current layer, and splice the compression result of each convolution layer to generate an image recognition model; and     an image recognition module, configured to input an acquired image to be recognized into the image recognition model to obtain an image recognition result of the image to be recognized.

The embodiments of the present disclosure further provides an image recognition device, including a processor which is used for implementing the operations of the image recognition method described as anyone of the above embodiments when executing a computer program stored in a memory.

The embodiments of the present disclosure finally provides a computer-readable storage medium, storing an image recognition program thereon, when executed by the processor, causes the processor to implement the operations of the image recognition method described as anyone of the above embodiments.

The technical solution provided by the present disclosure has the advantage of performing network compression processing including a convolution kernel weight value estimation process and a channel clipping process on each convolution layer of the original neural network model in turn to obtain an image recognition model for performing image recognition tasks. As the image recognition model is obtained by compressing the original neural network model, the redundancy of the parameters of the original neural network model may be effectively reduced, data volume for performing task processing by the model is reduced, the calculation resources consumed in the image classification and recognition are effectively reduced, and the speed of the image classification and recognition is increased. The compressed network model does not need to be retrained, and is more convenient to operate, and the whole compression process runs in the process of inputting a classification image into a neural network for forward reasoning. In order to ensure the classification and recognition accuracy, output feature maps of input classification images in each layer of the original neural network are taken as the reconstruction targets, new weighting values of the convolution kernels of each layer are obtained by the kernel set construction, redundant convolution kernel channels are clipped, thus, the correlation between kernel set construction results and the distribution of different classification images is avoided, and the model generalization ability is effectively improved.

In addition, the embodiments of the present disclosure also provide a corresponding implementation device and a computer-readable storage medium for the image recognition method, which further make the method more practical. The device and the computer-readable storage medium have corresponding advantages.

It is understood that the above general description and the following detailed description are only exemplary, and may not limit the present disclosure.

BRIEF DESCRIPTION OF THE DRAWINGS

In order to more clearly explain the embodiments of the present disclosure or the technical solutions of related art, the following will briefly introduce the drawings needed in the embodiments or related technical descriptions. Obviously, the drawings in the following description are only some embodiments of the present disclosure. For ordinary technicians in the art, they may also obtain other drawings based on these drawings without paying creative labor.

DETAILED DESCRIPTION

In order to enable those in the technical field to better understand the solution of the present disclosure, the present disclosure will be further described in detail in combination with the drawings and specific embodiments. Obviously, the described embodiments are only part of the embodiments of the present disclosure, not all of them. Based on the embodiments of the present disclosure, all other embodiments obtained by ordinary technicians in the art without creative work belong to the scope of the present disclosure.

The terms "first", "second", "third" and "fourth" in the description and claims of the present disclosure and the above drawings are used to distinguish different objects, not to describe a specific order. In addition, the terms "including" and "having" and any deformation thereof are intended to cover non-exclusive inclusion. For example, a process, method, system, product or device that contains a series of steps or units is not limited to the listed steps or units, but may include steps or units that are not listed.

In order to reduce the calculation resources consumed by the image classification and recognition and increase the speed of the image classification and recognition, a depth neural network may be compressed, then a compressed neural network model is applied to perform image classification and recognition tasks, and thus, the efficiency of the model for outputting results may be effectively improved. Neural network compression solves the application bottleneck of deep learning in apparatuses with limited calculation and memory resources. Neural network compression pruning may reduce parameters and calculated amount of the neural network model, thereby reducing the memory space occupied by neural networks during storage and increasing the calculation speed of the neural networks during reasoning. A neural network pruning method is divided into coarse-grained pruning and fine-grained pruning according to processing objects. The coarse-grained pruning, also known as structured pruning, compresses the filter-level, channel-level, row or column-level structures of the neural network. The fine-grained pruning, also known as unstructured pruning, may filter and remove individual weights, has the advantage of preserving the accuracy of the neural network to the maximum extent, and has the disadvantage that the sparse matrix computation of the unstructured pruning depends on specialized runtime libraries and hardware apparatuses. The structured pruning method gets more attention and is widely used due to hardware friendliness thereof.

Figure 1:
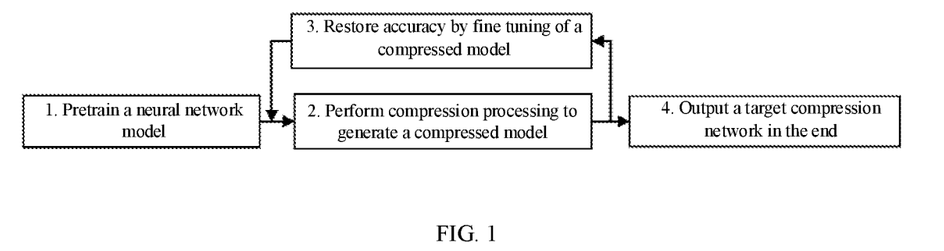
FIG. 1 is a schematic diagram of a compression flow of a neural network model in the prior art provided by an embodiment of the present disclosure.

A traditional algorithm flow of the neural network compression pruning includes the iteration of pruning and fine tuning. As shown in FIG. 1, the operation of this algorithm is very time-consuming. To solve this problem, some studies have proposed a number of neural network compression pruning methods, which do not rely on a fine-tuning process to compensate the accuracy loss caused by compression. For example, the existing channel pruning for accelerating very deep neural networks (CPA) completes channel compression and weight parameter reconstruction in the forward reasoning process of the neural network, and may achieve the less accuracy loss of the network after compression without fine turning. According to the present method, input channels of convolution layers of the neural network are filtered layer by layer based on least absolute shrinkage and selection operator (LASSO) regression, and then feature map reconstruction errors are optimized by a least square method to obtain new weight parameters of the convolution kernels without the need of fine tuning, which are directly used as the weight parameters of the convolution kernels of the compressed network. However, the compression effect of the compression method based on the feature map reconstruction error optimization is dependent on input data, and the difference of input data sets will lead to the change of filtering results of importance evaluation rules based on amplitudes. A data-independent network compress method, i.e., data-independent neural pruning via coresets (DINP), has been researched and developed, and provides a theoretical basis for the tradeoff between compression ratios and estimation errors on the basis of the vapnik-chervonenkis dimension (VC dimension) of the neural network and the kernel set theory. According to the DINP, an offline and streaming corset constructions (OSCC) algorithm is adopted to construct kernel sets for hidden layer neurons of fully connected layers. The OSCC algorithm provides the derivation of a kernel set size calculation formula based on the VC dimension of data. On this basis, the DINP gives a neuron importance evaluation rule based on an upper bound of an activation function value and a kernel set sampling probability. As the calculation and allocation of weighting coefficients of each sample are both independent of the input data in the process of kernel set construction, kernel set construction results of the DINP have the characteristic of being independent of data. However, as the DINP is only specific to the fully connected layer and is not applicable to the convention layer, the DINP has a limitation on the compression rate of deep convolutional neural networks and the applicable range of network models, and is not yet applicable to convolutional neural networks that do not include fully connected layers, such as you only look once (yolo) series neural networks and region-based fully convolutional networks (R-FCN). In addition to the DINP method, the early application of the kernel set theory in neural network compression has data dependence. Although there are also methods that apply the kernel set theory to the low-rank decomposition to compress the convolution layers and the fully connected layers, the construction of the kernel set itself may not compress the neural networks.

Figure 2:
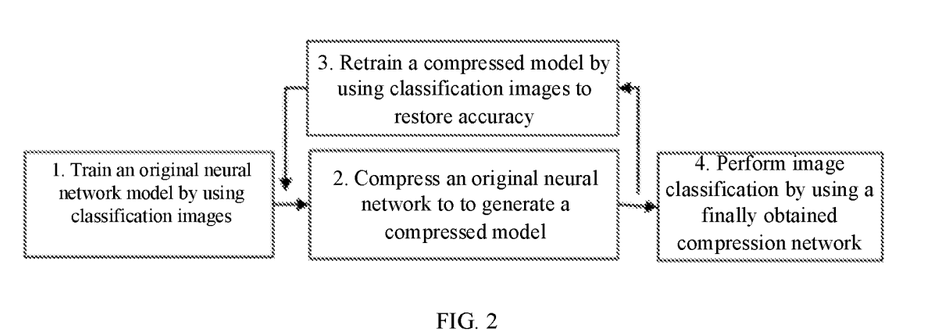
FIG. 2 is a flow chart of a method adopting a network compression mode of the prior art to perform image recognition tasks provided by an embodiment of the present disclosure.

On the condition that the method flow of using the neural network model processed by the above-mentioned neural network compression method to perform image classification and recognition tasks is as shown in FIG. 2, it is necessary to first use sample data to train an original neural network model, then the above-mentioned neural network compression method is used to compress an original neural network to generate a compressed model, then training sample data is used to train the compressed model again to restore the image recognition accuracy, and the finally trained compressed model is used to perform the image classification task. The training process of the neural network compression itself needs to cyclically repeat the process of compressing the network layer by layer and retraining the network. Two model training processes undoubtedly increase a lot of data processing, and the model training process needs a lot of calculation resources and is complicated in operation. In order to simplify the training process of neural network compression and reduce the cost of obtaining the compressed model in the image classification and recognition task, the present disclosure provides a structured pruning neural network compression process which does not require retraining and does not depend on input data, and performs convolution kernel parameter estimation based on the kernel set theory and compression pruning layer by layer in turn during the forward reasoning of the neural network. The process runs in the process of the forward reasoning of a classification image input neural network. In order to ensure the classification accuracy, output feature maps of input classification images in each layer of the original neural network are taken as reconstruction targets, new weighting values of the convolution kernels of each layer are obtained by the kernel set construction, and redundant convolution kernel channels are clipped. According to the present process, a new way of kernel set construction is designed to avoid the correlation between kernel set construction results and the distribution of different classification images and improve generalization ability.

After the technical solution of the embodiment of the present disclosure is introduced, various non-limiting embodiments of the present disclosure are described in detail below.

Figure 3:
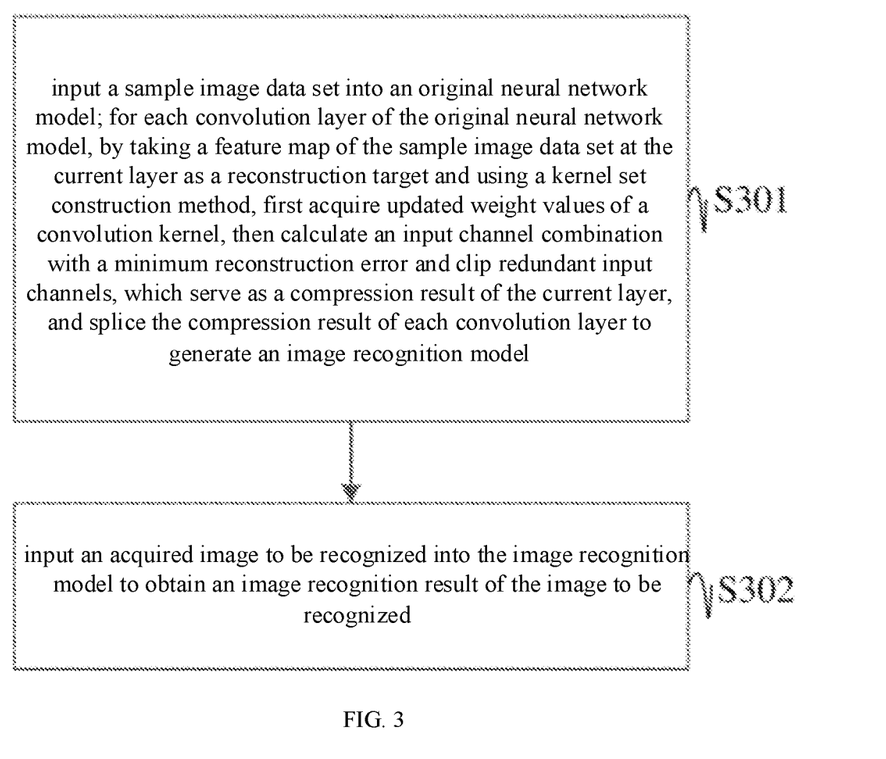
FIG. 3 is a flow chart of an image recognition method provided by an embodiment of the present disclosure.
Figure 4:
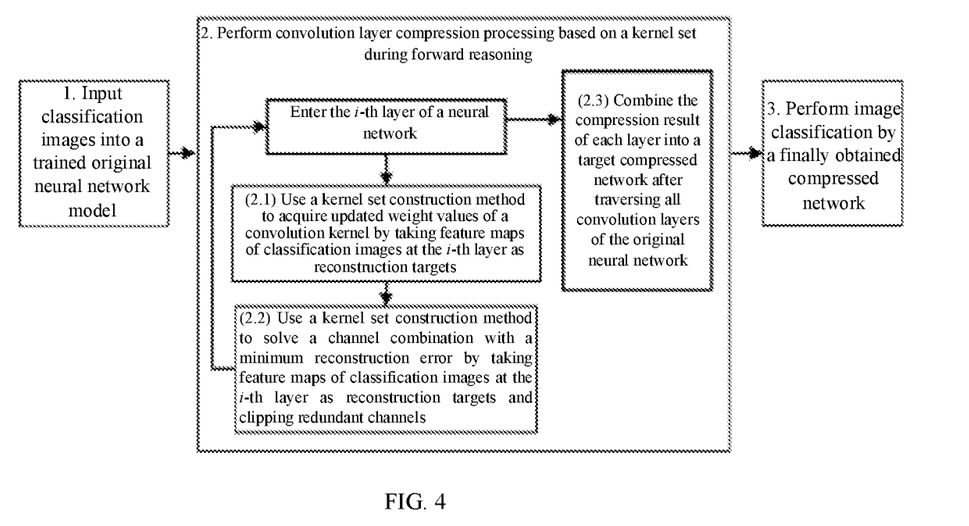
FIG. 4 is a flow chart of another image recognition method provided by an embodiment of the present disclosure.

Firstly, referring to FIG. 3 and FIG. 4, FIG. 3 is a flow chart of an image recognition method provided by an embodiment of the present disclosure. The embodiment of the present disclosure may include the following contents:

S301: inputting a sample image data set into the original neural network model in advance; for each convolution layer of the original neural network model, by taking a feature map of the sample image data set at the current layer as a reconstruction target and using a kernel set construction method, first acquiring updated weight values of a convolution kernel, then calculating an input channel combination with a minimum reconstruction error and clipping redundant input channels, which serve as a compression result of the current layer; and splicing the compression result of each convolution layer to generate an image recognition model.

In the present step, the original neural network model is any type of trained neural network model, for example, may be of a supervised learning network type, may also be of an unsupervised learning network type, may also be of an associative learning network type, or is of an optimized application network type. The original neural network model may be, for example, Hopfield network (HN), Convolutional Neural Networks (CNN), Deconvolutional networks (DN), Generative Adversarial Networks (GAN), Recurrent Neural Networks (RNN), and the like, which do not affect the implementation of the present disclosure. The sample image data set may or may not be training data used in the training process of the original neural network model, which does not affect the implementation of the present disclosure. The image recognition model is a network model after the original neural network model is compressed; in the forward reasoning process of the original neural network model, neural network layers are compressed layer by layer; a convolution kernel weight value estimation operation is firstly performed in the compression process of each layer to directly obtain weight parameters of the complete convolution kernel of the current layer; then a channel clipping operation is performed to filter input channels, output channels of a convolution kernel of the previous layer corresponding to the input channels are clipped, and a convolution result of the compressed convolution kernel of the current layer and the input data is taken as input data of the next layer; and after all the convolution layers of the original neural network model have been compressed, generated compressed network layers are spliced together to form a complete compressed neural network model.

It should be noted that the compression process of the original neural network model has the limitation of the sequential order of performing, i.e., the sequential order of firstly performing the convolution kernel weight value estimation operation and then performing the channel clipping operation, and both the convolution kernel weight value estimation operation and the channel clipping operation adopt the kernel set construction theory. The kernel set construction theory may be referred to relevant literatures, and will not be described again here.

S302: inputting an acquired image to be recognized into the image recognition model to obtain an image recognition result of the image to be recognized.

In the present step, the number of the image to be recognized may be one or multiple, and the image type is not limited; and the image recognition model is used for performing an image classification and recognition operation, and matches the input data, namely, the image to be recognized with a suitable label, and then outputs the label type as the image recognition result.

In the technical solution provided by an embodiment of the present disclosure, network compression processing including a convolution kernel weight value estimation process and a channel pruning process is performed on each convolution layer of the original neural network model in turn to obtain the image recognition model for performing the image recognition tasks. As the image recognition model is obtained by compressing the original neural network model, the redundancy of the parameters of the original neural network model may be effectively reduced, data volume for performing task processing by the model is reduced, the calculation resources consumed in the image classification and recognition are effectively reduced, and the speed of the image classification and recognition is increased. The compressed network model does not need to be retrained, and is more convenient to operate, and the whole compression process runs in the process of inputting a classification image into a neural network for forward reasoning. In order to ensure the classification and recognition accuracy, output feature maps of input classification images in each layer of the original neural network are taken as the reconstruction targets, new weighting values of the convolution kernels of each layer are obtained by the kernel set construction, redundant convolution kernel channels are clipped, thus, the correlation between kernel set construction results and the distribution of different classification images is avoided, and the model generalization ability is effectively improved.

It should be noted that by performing a compression operation on the image recognition model during image recognition, the above-mentioned embodiment reduces the data processing volume and the calculation resources consumed in the image classification and recognition, and improves the efficiency of image recognition. For example, the technical solution of the present disclosure may also be used in, but is not limited to, an image feature extraction stage in the process of performing an object segmentation task or an object detection task, so that the efficiency of the object segmentation and the efficiency of the object detection may be improved, and the calculation resources consumed in the process of performing tasks may be reduced.

In addition, it may be understood that the image is two-dimensional data, the convolution kernel of the neural network model in the above-mentioned embodiment is described by taking a two-dimensional convolution kernel as an example; the present disclosure is also applicable to convolution kernel compression of one-dimensional convolution; accordingly, an extended and compressed depth neural network model is applied to the field of one-dimensional sequence data processing, for example, the task of anomaly classification of one-dimensional data such as medical electrocardiosignal. That is to say, in the process of performing the classification and recognition task of one-dimensional data such as medical electrocardiogram and heart sound signals, one-dimensional physiological signal data may be used as the sample data set to train the original neural network model; for each convolution layer of the original neural network model, the kernel set construction method is used to firstly acquire the updated weight values of a one-dimensional convolution kernel by taking the feature map of the sample image data set at the current layer as the reconstruction target, then the input channel combination with the minimum reconstruction error is calculated, and the redundant input channels are clipped, which serve as the compression result of the current layer; and the compression result of each convolution layer is spliced to generate a physiological signal recognition model. The acquired one-dimensional physiological signal data is input into the physiological signal recognition model to obtain a recognition classification result of the physiological signal to be recognized. Likewise, the present disclosure may be further extended to convolution kernel compression of three-dimensional convolution, and accordingly, the expanded and compressed depth neural network model is applied to the field of three-dimensional sequence data processing, for example, may be applied to classification, recognition, target detection, etc. of three-dimensional data such as medical three-dimensional CT images, and for example, may be also applied to application scenes such as motion recognition in the field of video processing.

In order to reduce the influence of distribution change of the input data on the kernel set construction result, the present disclosure may also introduce a processing mechanism of multiple rounds of sampling in the convolution kernel weight value estimation operation. The input channels are sampled according to a probability to construct a channel kernel set. Weight values are generated for the compressed convolution kernel with the goal of minimizing the feature map reconstruction error based on the result of multiple rounds of sampling; and as the sampling has certain randomness, convolution kernel weight values generated without repeated sampling of multiple channels have adaptability to different channel selection results, that is, an implementation of S301 may include the following contents:

Firstly, it should be explained that compared with the traditional kernel set theory, in the process of using the kernel set construction method to update the convolution kernel, the present disclosure has the following characteristics:

(1) the objects of the kernel set construction are the input channels of the convolution layer, rather than a single neuron; (2) the VC dimension of the constructed kernel set may be reduced to 1, and does not need to be equal to the number d of neurons of a fully connected layer of a (l−1)-th layer or other high-dimensional value; in particular, when the kernel set S is constructed for the l-th convolution layer according to the present disclosure, a set P to be sampled with the VC dimension being equal to 1 is constructed; a parameter tensor of a four-dimensional convolution kernel tensor of the l-th layer along a certain input channel or a parameter tensor of a three-dimensional feature map tensor output by the (l−1)-th layer along a certain output channel are directly taken as a sample of the set P; then the number of samples of the set P is equal to the number of the input channels of the convolution kernel of the l-th layer or the number of feature map output channels of the (l−1)-th convolution layer; (3) the calculation formula of the importance of each sample in the set P designates the number a of target compressed channels as the dimension of the target kernel set S, and then relates the sum function t of the importance to the number a of the target compressed channels, namely, the dimension of the target kernel set S, so that the upper bound of the sum function t of the importance is constrained within a controllable value range.

Secondly, an implementation process of "by taking a feature map of the sample image data set at the current layer as a reconstruction target and using a kernel set construction method, first acquiring updated weight values of a convolution kernel" is as follows:

A1. determining the importance of each input channel of the current layer according to the feature map of each sample data in the sample image data set at each input channel of the current layer;

A2. setting an importance weighting coefficient for each input channel according to the importance of each input channel;

A3. determining a sampling probability of each input channel by calculating a weighted importance function of each input channel and the sum function;

A4. performing multiple rounds of sampling on the corresponding input channel according to the sampling probability of each input channel, performing multiple sampling on the input channel set of the current layer per round according to the sampling probability to obtain the kernel set, calculating and accumulating feature map reconstruction errors corresponding to the channel kernel set, and obtaining an updated value of a convolution kernel weight of the current layer by calculating an optimization function that minimizes the feature map reconstruction errors.

First, an initial importance function $g_i(x)$ of the input channel is calculated according to the input data of the l-th layer, i.e., the sample image data set. Then an importance weighting coefficient $w_i(x)$ is assigned to the importance of each input channel of the l-th layer according to the convolution kernel of the l-th layer, and $w_i(x)$ represents the weighting coefficient constructed for non-uniform sampling of each input channel. The specific operation of assigning the weighting coefficient is to calculate a $L_1$ norm $\|W_i\|_1$ of the parameter tensor $W_i$ of the convolution kernel of the l-th layer in different input channels, and then according to the descending sort of the values of $\|W_i\|_1$, relatively large weight values $w_i(x)=1/(a_l+1)$ are assigned to first $a_l$ sorted input channels, and relatively small weight values $w_i(x)=1/(a_l+1)(m_{l-1}-a_l)$ are assigned to other input channels. In such a way that both the calculation and assignment of the weighting coefficients are independent of the input data, the construction result of the kernel set S has the advantage of being independent of the input data as the currently constructed kernel set S is not the result of selection under specific data distribution. Finally, the weighted importance functions $s_i(x)$ of all input channels and the sum function t are calculated, that is, a pre-stored importance function relationship formula may be invoked to calculate the weighted importance function of each input channel; and the sampling probability $p_i$ of the i-th input channel may be expressed as $p_i=s_i(x)/t$. The importance function relationship formula may be expressed as:

$$s_i(x)=w_i(x) \cdot g_i(x)$$

where $s_i(x)$ represents the weighted importance function of the i-th input channel, $w_i(x)$ represents the importance weighting coefficient of the i-th input channel, and $g_i(x)$ represents the initial importance function of the i-th input channel;

$$g_i(x) = \max_{x \in X}(\|x_i\|_F^2)/\frac{1}{m_{l-1}}\sum_{i=1}^{m_{l-1}}\max_{x \in X}(\|x_i\|_F^2),$$

$$w_i(x) = \begin{cases} 1/(a_l+1), & i \le a_l \\ 1/(a_l+1)(m_{l-1}-a_l), & a_l \le i \le m_{l-1} \end{cases},$$

$$\sum_{i=1}^{m_{l-1}} w_i(x) = 1,$$

where $a_l$ represents the number of compressed input channels to be achieved by the l-th convolution layer target of the original neural network model, $m_{l-1}$ represents the number of output channels of the (l−1)-th layer of the neural network, $$\max_{x \in X}\|x_i\|_F^2$$

represents the maximum value of the Frobenius norms of the feature map $x_i$ of each sample data in the sample image data set X in the i-th input channel, $m_{l-1}$ represents the total number of the output channels of the (l−1)-th convolution layer of the original neural network model, $$\frac{1}{m_{l-1}}\sum_{i=1}^{m_{l-1}}\max_{x \in X}(\|x_i\|_F^2)$$

represents the mean value of the maximum values of the Frobenius norms of the feature maps of all the input channels, $a_l$ represents the number of compressed input channels to be achieved by the l-th convolution layer target of the original neural network model, and t represents the sum function; and $t=\sum_{i=1}^{m_{l-1}} s_i(x)$.

The importance function $s_i(x)$ with the weight constructed according to the present disclosure may provide a constraint for the value range of the sum t of importance, i.e., ensuring $$\frac{m_{l-1}}{(a_l+1)(m_{l-1}-a_l)} \leq t \leq \frac{m_{l-1}}{a_l+1};$$

and when $a_l = m_{l-1} - 1$, equal signs hold. Furthermore, as the calculation formula contains a calculation factor $a_t$ reflecting the compression ratio, the upper bound and the lower bound of t may be flexibly adjusted and controlled by modifying the number of target compression channels.

In other existing neural network compression techniques based on kernel sets, there is no discussion about the upper bound of the value of t. However, t is a very important parameter in the transformation of the kernel set construction algorithm from theory to actual operation, and affects the lower bound |S| of the dimension of the target kernel set to be constructed. The kernel set construction algorithm (OSCC) proves that when a subset S is randomly sampled from a set P according to a probability, on the condition that $$|S| \geq \frac{ct}{\varepsilon^2}(d \log t + \log \frac{1}{\delta})$$

is satisfied, $c \geq 1$, c is a constant, $g_i(x)$ is a non-negative function, and an error parameter $\varepsilon \in (0,1)$, where d represents the VC dimension of the set P, and then the kernel set S becomes the $\varepsilon$-kernel set, that is, $\varepsilon$-coreset of the query space of the set P with a probability $1-\delta$. The definition of the $\varepsilon$-coreset may be found in the original text of the OSCC algorithm. This theorem shows that the value t may guide the setting of the dimension |S| of the kernel set.

The dimension of the input data of an activation function of the (l−1)-th layer is expressed as $mh^2$, where m represents the number of the output channels, and h represents the size of the output feature map. On the condition that the convolution kernel is not shared between different input channels of the l-th convolution layer, that is, the convolution kernel has a four-dimensional tensor of $n \times m \times k \times k$, the parameter values of the same output channel of the convolution kernel are different for different channels of the input data, and the parameter dimension of the convolution kernel is equal to $nmk^2$. In the scenario of the method provided by the present disclosure, the parameter of the convolution kernel at a certain input channel is used as a processing unit for a compression operation, or the parameter of the output feature map of the convolution layer at a certain output channel is used as a processing unit, that is, $m \times k \times k$ convolution kernel parameters or $h \times h$ feature map parameters are used as processing units, therefore, the data dimension of the convolution kernel at the l-th convolution layer may be further simplified as $n_l$, the data dimension of the activation function of the (l−1)-th layer is also simplified as $m_{l-1}$, and the corresponding VC dimensions of the l-th convolution layer and the (l−1)-th layer are both simplified as 1, that is, $d_l=1$ and $d_{l-1}=1$. Considering that the complexity of the kernel set construction algorithm is approximately equal to the number of parameters required to define once query, the number of parameters required to perform a query on the set P with the VC dimension being d is at least d+1, and the complexity of the kernel set construction algorithm may be reduced by reducing the VC dimension of the set P. When the method provided by the present disclosure is used for compressing the input channels of the l-th convolution layer, the VC dimension $d_{l-1}$ of the activation function of the (l−1)-th layer and the VC dimension $d_l$ of the convolution kernel parameters of the l-th layer will be affected simultaneously, which requires that the dimension |S| of kernel set of the input channels constructed for the l-th convolution layer simultaneously satisfies the constraint determined by $d_{l-1}$ and $d_l$. When the number of target compressed channels of the l-th convolution layer is a, the dimension $|S_{l-1}|$ of the target kernel set corresponding to the activation function of the (l−1)-th layer and the dimension $|S_l|$ of the target kernel set corresponding to the convolution kernel parameters of the l-th layer are both equal to a. As the value $$\frac{m_{l-1}}{a+1}$$

of the upper bound sup(t) of the sum t of the importance functions constructed in the present disclosure at the (l−1)-th layer is equal to the value $$\frac{n_l}{a+1}$$

or the upper bound sup(t) at the l-th layer, that is, $\sup(t_{l-1}) = \sup(t_l)$, a may simultaneously satisfy the requirements of the following two inequalities:

$$|S_{l-1}| \geq \frac{ct_{l-1}}{\varepsilon^2}\left(d_{l-1} \log t_{l-1} + \log \frac{1}{\delta}\right) \to a \geq \frac{ct_{l-1}}{\varepsilon^2}\left(\log t_{l-1} + \log \frac{1}{\delta}\right)$$

$$|S_l| \geq \frac{ct_l}{\varepsilon^2}\left(d_l \log t_l + \log \frac{1}{\delta}\right) \to a \geq \frac{ct_l}{\varepsilon^2}\left(\log t_l + \log \frac{1}{\delta}\right).$$

In summary, the sum t of the importance functions constructed in the present disclosure not only has controllable upper and lower bounds, but also may make the number a of the target compressed channels simultaneously satisfy the constraints of two convolution layers on the dimension of the target kernel set. In addition, when the number a of the target compressed channels and the sum t of the importance functions are known, the approximate error $\varepsilon$ between the currently constructed target kernel set S and the set P may also be estimated, which may be used as a reference index for side evaluation of the effect of compression.

R rounds of sampling are performed on the input channels of the input data independently; the input channel set P of the l-th convolution layer is sampled a times per round according to a probability $p_i$ to obtain one kernel set S; the feature map reconstruction errors corresponding to the channel kernel set S are calculated and accumulated; a new weight value $W_{ik}*$ of a complete convolution kernel is solved according to the following optimization function; the optimization function aims at minimizing the sum of weight value estimation errors of all convolution kernels, that is, a pre-stored weight value updating relationship formula may be invoked to obtain an updated value of a convolution kernel weight of the current layer; the weight value updated relationship formula may be expressed as:

$$\min \sum\nolimits_{k=1}^{K} \frac{1}{R} \sum\nolimits_{r=1}^{R} \left\| Y_k - \sum\nolimits_{x_i \in S} x_i * W_{ik}^* \right\|_F^2;$$

where $Y_k$ represents the output feature map of the uncompressed convolution kernel at a k-th output channel, K represents the total number of the output channels of the convolution kernel of the current layer, $\Sigma_{k=1}^{K}(\cdot)$ represents the respective calculation of feature map reconstruction errors for the K output channels of the convolution kernel and the summarization of the errors; $\Sigma_{r=1}^{R}(\cdot)$ represents R rounds of independent sampling of the input channel combination of the input sample image data set and the accumulation of the feature map reconstruction errors of each sampling result, $\|\cdot\|_F^2$ represents a Frobenius norm, $W_{ik}^*$ represents an updated value of a weight tensor of the convolution kernel of the current layer at the i-th input channel and the k-th output channel, and serve as a solution target of the convolution kernel weight value estimation operation based on the kernel set, S represents the kernel set composed of a input channels sampled from C input channels of the input sample image data set; $\Sigma_{x_i \in S} x_i^* W_{ik}^*$ represents the sum of output feature maps of feature maps $x_i$ of all input channels in the kernel set S at a channel, namely, the k-th output channel, corresponding to the convolution kernel; and * represents a convolution operation.

From the above, it shows that in the convolution kernel parameter estimation process based on the kernel set of the present disclosure, objects to be processed are uncompressed convolution kernels; when the channel kernel set is constructed, multiple rounds of sampling are performed on the input channels of the convolution kernel; parameter estimation results have adaptability to random selection results of the channels by optimizing the average value of the feature map reconstruction errors of the channels subjected to multiple rounds of sampling; in addition, the process adopts a unique calculation formula to calculate the importance of each input channel, transforms the sum function of the channel importance into a function directly related to the number of the target compressed channels, and then constrains the sum function of the channel importance to an adjustable value range, so that the kernel set theory has practical significance for the constraint of the lower bound of the kernel set dimension.

The above-mentioned embodiment does not define how to perform the channel clipping operation in step S301. The present embodiment also provides a channel clipping method, that is, an implementation process of using a kernel set construction method to calculate the input channel combination with the minimum reconstruction error and clipping the redundant input channels may be as follows:

B1. determining the probability that each input channel of the current layer is selected according to the updated weight value of the convolution kernel of the current layer, and forming the probability that each input channel is selected into a hit probability set.

B2. calculating the input channel combination with the minimum output feature map reconstruction error based on the hit probability set, and removing non-selected input channels according to the input channel combination.

B3. calculating the output feature map of the compressed convolution kernel, using a convolution result of the compressed convolution kernel of the current layer and the sample image data set as the input data of a next convolution layer of the current layer.

A pre-stored selection probability relationship formula may be invoked to calculate the probability that each input channel of the current layer is selected. The selection probability relationship formula is as follows:

$$q_i = (w_i(x) \cdot f_i(x)) / \Sigma_{i=1}^{m_{l-1}} (w_i(x) \cdot f_i(x));$$

In the formula, $$f_i(x) = \max_{x \in X} \left( \left\| x_i * \sum\nolimits_{k=1}^{K} W_{ik}^* \right\|_F^2 \right) / \frac{1}{n_l} \sum\nolimits_{i=1}^{n_l} \max_{x \in X} \left( \left\| x_i * \sum\nolimits_{k=1}^{K} W_{ik}^* \right\|_F^2 \right),$$

where $w_i(x)$ represents the importance weighting coefficient of the i-th input channel, $m_{l-1}$ represents the total numbers of the output channels of the (l-1)-th convolution layer of the original neural network model, X represents the sample image data set, $x_i$ represents the feature map of each sample data in the sample image data set in the i-th input channel, K represents the total number of the output channels of the convolution kernel of the current layer, $W_{ik}^*$ represents the updated value of the weight tensor of the convolution kernel of the current layer in the i-th input channel and the k-th output channel; $\|\cdot\|_F^2$ represents the Frobenius norm; and $n_l$ represents the total number of the input channels of the original neural network model at the l-th layer, i.e., the current layer. The hit probability set formed by the probability that each input channel is selected may be expressed as: $q = \{q_i | 1 \leq i \leq C\}$. Then, a pre-stored optimization function relationship formula is invoked to calculate the input channel combination $\gamma$ with the minimum output feature map reconstruction error, and the non-selected input channel is removed according to the solved $\gamma$, that is, the input channel corresponding to $\gamma_i = 0$ is removed. The optimization function relationship formula may be expressed as:

$$\operatorname*{argmin}_{\gamma} \left\| Y - \sum\nolimits_{k=1}^{K} \sum\nolimits_{i=1}^{C} \gamma_i X_i W_{ik}^* \right\|_F^2 + (1-q)\gamma;$$

where Y represents the output feature map of the original neural network model at the current layer, K represents the total number of the output channels of the convolution kernel at the current layer, $\gamma_i$ represents whether the i-th channel is selected, the value of $\gamma_i$ is 0 or 1, $\gamma = \{\gamma_i | 1 \leq i \leq C\}$ represents the best sampling result of the a input channels sampled from the C input channels, and satisfies the condition $\|\gamma\|_0 = a$, $X_i$ represents the feature map of the sample image data set at the i-th input channel of the current layer, and $x_i$ represents the feature map of the i-th input channel of the single sample data of the sample image data set at the current layer; $W_{ik}^*$ represents an updated value of a weight tensor of the convolution kernel of the current layer at the i-th input channel and the k-th output channel; $\|\cdot\|_F^2$ represents the Frobenius norm; $(1-q)\gamma$ represents the addition of a vector constructed by the sampling probability of each input channel as a penalty factor to a penalty term in the optimization objective function; and q represents the hit probability set.

According to the present embodiment, a unique calculation function is designed for the importance of each channel on the basis of the kernel set theory, and an optimization objective function for solving the input channel combination that minimizes the output feature map reconstruction error is designed, and further a vector composed of the sampling probability of each channel as the penalty factor is added to the optimization objective function. In other existing compression methods, the penalty factor usually serves as a scalar, while in the present disclosure, the vector is used to provide different constraints for different channels. The neural network compression method may achieve the channel pruning in the forward reasoning process of the neural network, eliminate the step of network fine-tuning after compression, simplify the neural network compression process, reduce the calculated amount and time delay of the neural network compression process, and provide a theoretical analysis tool for the tradeoff between a channel compression ratio of the convolution layer and the performance loss based on the kernel set construction algorithm.

It should be noted that there is no strict sequential performing order among the steps in the present disclosure, and as long as the logical order is satisfied, these steps may be performed simultaneously, or may be performed in a certain pre-set order; and FIG. 3 and FIG. 4 are merely a schematic mode and do not represent that this is the only performing order.

The embodiments of the present disclosure also provide a corresponding device for the image recognition method, which further makes the method more practical. The device may be illustrated respectively from the perspective of functional modules and hardware. An image recognition device provided by the embodiment of the present disclosure will be described below, and the image recognition device described below and the image recognition method described above may be referred to each other correspondingly.

Figure 5:
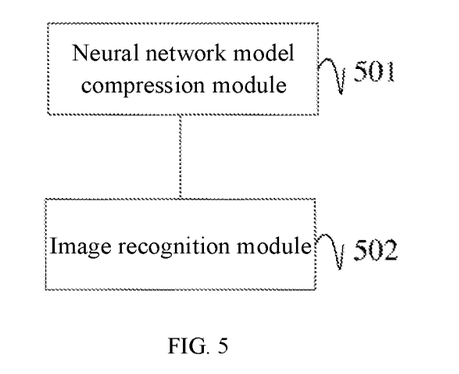
FIG. 5 is a structure diagram of a specific implementation of an image recognition device provided by an embodiment of the present disclosure.

From the perspective of the functional modules, referring to FIG. 5, which is a structure diagram of an image recognition device provided by an embodiment of the present disclosure in a particular implementation mode. The device may include:

- a neural network model compression module 501, configured to input a sample image data set into an original neural network model, for each convolution layer of the original neural network model, by taking a feature map of the sample image data set at the current layer as a reconstruction target and using a kernel set construction method, first acquire updated weight values of a convolution kernel, then calculate an input channel combination with a minimum reconstruction error and clip redundant input channels, which serve as a compression result of the current layer, splice the compression result of each convolution layer to generate an image recognition model; and
- an image recognition module 502, configured to input an acquired image to be recognized into the image recognition model to obtain an image recognition result of the image to be recognized.

Alternatively, in some implementation modes of the present embodiment, the neural network model compression module 501 may include a weight value updating sub-module. The weight value updating sub-module includes:

- an importance calculation unit, configured to determine the importance of each input channel of the current layer according to the feature map of each sample data in the sample image data set at each input channel of the current layer;
- a weighting coefficient calculation unit, configured to set an importance weighting coefficient for each input channel according to the importance of each input channel;
- a sampling probability calculation unit, configured to determine a sampling probability of each input channel by calculating a weighted importance function of each input channel and a sum function;
- a weight value updating unit, configured to perform multiple rounds of sampling on the corresponding input channel according to the sampling probability of each input channel, performing multiple sampling on the input channel set of the current layer per round according to the sampling probability to obtain the kernel set, calculate and accumulate feature map reconstruction errors corresponding to the channel kernel set, and obtain an updated value of a convolution kernel weight of the current layer by calculating an optimization function that minimizes the feature map reconstruction errors.

In some implementation modes of the present embodiments, the sampling probability calculation unit may invoke a pre-stored importance function relationship formula to calculate the weighted importance function of each input channel; the importance function relationship formula may be expressed as:

$$s_i(x) = w_i(x) \cdot g_i(x);$$

the sampling probability $p_i$ of the i-th input channel is expressed as $p_i = s_i(x)/t$;

where $s_i(x)$ represents the weighted importance function of the i-th input channel, $w_i(x)$ represents the importance weighting coefficient of the i-th input channel, and $g_i(x)$ represents the initial importance function of the i-th input channel $$g_i(x) = \max_{x \in X}(\|x_i\|_F^2) / \frac{1}{m_{l-1}} \sum_{i=1}^{m_{l-1}} \max_{x \in X}(\|x_i\|_F^2),$$

$$w_i(x) = \begin{cases} 1/(a_l + 1), & i \le a_l \\ 1/(a_l + 1)(m_{l-1} - a_1), & a_l \le i \le m_{l-1} \end{cases},$$

$$\sum_{i=1}^{m_{l-1}} w_i(x) = 1, \text{ where } \max_{x \in X} \|x_i\|_F^2$$

represents the maximum value of the Frobenius norms of the feature map $x_i$ of each sample data in the sample image data set X in the i-th channel, $m_{l-1}$ represents the total number of the output channels of the (l–1)-th convolution layer of the original neural network model, $$\frac{1}{m_{l-1}} \sum_{i=1}^{m_{l-1}} \max_{x \in X}(\|x_i\|_F^2)$$

represents the mean value of the maximum values of the Frobenius norms of the feature maps of all the input channels, $a_l$ represents the number of compressed input channels to be achieved by the l-th convolution layer target of the original neural network model, t represents the sum function; and $t = \sum_{i=1}^{m_{l-1}} s_i(x)$.

In other implementation modes of the present disclosure, the weight value updating unit may invoke a pre-stored weight value updating relationship formula to obtain an updated value of a convolution kernel weight of the current layer; the weight value updated relationship formula is expressed as:

$$\min \sum_{k=1}^{K} \frac{1}{R} \sum_{r=1}^{R} \left\| Y_k - \sum_{x_i \in S} x_i * W_{ik}^* \right\|_F^2;$$

where $Y_k$ represents the output feature map of the uncompressed convolution kernel at the k-th output channel, K represents the total number of the output channels of the convolution kernel of the current layer, $\Sigma_{k=1}^{K}(\cdot)$ represents the respective calculation of feature map reconstruction errors for the K output channels of the convolution kernel and the summarization of the errors; $\Sigma_{r=1}^{R}(\cdot)$ represents the R rounds of independent sampling of the input channel combination of the input sample image data set and the accumulation of the feature map reconstruction errors of each sampling result; $\|\cdot\|_F^2$ represents the Frobenius norm; $W_{ik}^*$ represents an updated value of a weight tensor of the convolution kernel of the current layer at the i-th input channel and the k-th output channel, and serves as a solution target of the convolution kernel weight value estimation operation based on the kernel set; S represents the kernel set composed of a input channels sampled from C input channels of the input sample image data set; $\Sigma_{x_i \in S} x_i * W_{ik}^*$ represents the sum of output feature maps of feature maps $x_i$ of all input channels in the kernel set S at an output channel, corresponding to the convolution kernel; and * represents a convolution operation.

Alternatively, in some implementation modes of the present disclosure, the neural network model compression module 501 may include a channel chipping sub-module. The channel chipping sub-module, for example, may include:

a probability calculation unit, configured to determine the probability that each input channel of the current layer is selected according to the updated weight value of the convolution kernel of the current layer, and form the probability that each input channel is selected into a hit probability set;

a channel selection unit, configured to calculate the input channel combination with the minimum output feature map reconstruction error based on the hit probability set, and remove non-selected input channels according to the input channel combination; and a feature map calculation unit, configured to calculate the output feature map of the compressed convolution kernel, and use a convolution result of the compressed convolution kernel of the current layer and the sample image data set as the input data of a next convolution layer of the current layer.

In some implementation modes of the present embodiment, the channel selection unit may invoke the pre-stored optimization function relationship formula to calculate the input channel combination $\gamma$ with the minimum output feature map reconstruction error. The optimization function relationship formula may be expressed as:

$$\arg \min_{\gamma} \left\| Y - \sum_{k=1}^{K} \sum_{i=1}^{C} \gamma_i X_i W_{ik}^* \right\|_F^2 + (1-q)\gamma;$$

where Y represents the output feature map of the original neural network model at the current layer, K represents the total number of the output channels of the convolution kernel at the current layer, $\gamma_i$ represents whether the i-th channel is selected, the value of $\gamma_i$ is 0 or 1, $\gamma = \{\gamma_i | 1 \le i \le C\}$ is the best sampling result of the a input channels sampled from the C input channels, and satisfies the condition $\|\gamma\|_0 = a$; $X_i$ represents the feature map of the sample image data set at the i-th input channel of the current layer, $W_{ik}^*$ represents an updated value of a weight tensor of the convolution kernel of the current layer at the i-th input channel and the k-th output channel; $\|\cdot\|_F^2$ represents a Frobenius norm; $(1-q)\gamma$ represents the addition of a vector constructed by the sampling probability of each input channel as a penalty factor to a penalty term in the optimization objective function; and q represents the hit probability set.

In some other implementation modes of the present embodiment, the probability calculation unit may invoke a pre-stored selection probability relationship formula to calculate the probability that each input channel at the current layer is selected. The selection probability relationship formula may be expressed as:

$$q_i = (w_i(x) \cdot f_i(x)) / \Sigma_{i=1}^{m_{l-1}} (w_i(x) \cdot f_i(x))$$

where $$f_i(x) = \max_{x \in X} \left( \left\| x_i * \sum_{k=1}^{K} W_{ik}^* \right\|_F^2 \right) / \frac{1}{n_l} \sum_{i=1}^{n_l} \max_{x \in X} \left( \left\| x_i * \sum_{k=1}^{K} W_{ik}^* \right\|_F^2 \right);$$

$w_i(x)$ represents the importance weighting coefficient of the i-th input channel; $m_{l-1}$ represents the total number of output channels of the (l−1)-th convolution layer of the original neural network model; X represents the sample image data set; $x_i$ represents the feature map of each sample data in the sample image data set in the i-th input channel; K represents the total number of output channels of the convolution kernel of the current layer; $W_{ik}^*$ represents the updated value of the weight tensor of the convolution kernel of the current layer in the i-th input channel and the k-th output channel; $\|\cdot\|_F^2$ represents the Frobenius norm; and $n_l$ represents the total number of input channels of the original neural network model in the l-th layer.

The functions of each functional module of the image recognition device provided by the embodiment of the present disclosure may be implemented by the method in the above-described: method embodiment, and the specific implementation process of the functions may be referred to the relevant description of the above-described method embodiment and will not be described in detail herein.

Therefore, the embodiment of the present disclosure may effectively improve the efficiency of image recognition and reduce the calculation resources consumed in the image recognition process.

Figure 6:
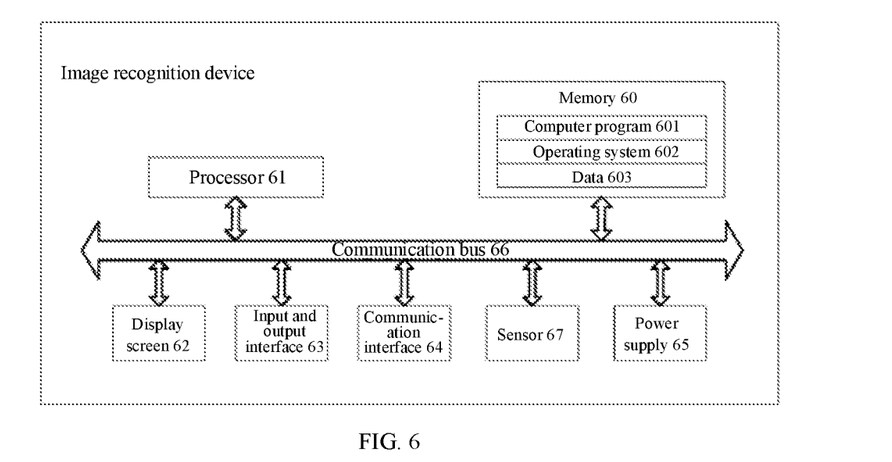
FIG. 6 is a structure diagram of another specific implementation of the image recognition device provided by an embodiment of the present disclosure.

The above-mentioned image recognition device is described from the perspective of the functional modules, and further, the present disclosure provides an image recognition device, which is described from the perspective of hardware. FIG. 6 is a structure diagram of another image recognition device provided by the embodiment of the present disclosure. As shown in FIG. 6, the device includes a memory 60 used for storing a computer program, and a processor 61 used for implementing the operations of the image recognition method as mentioned in any of the above embodiments when executing the computer program.

Thereinto, the processor 61 may include one or more processing cores, such as a four-core processor, and an eight-core processor. The processor 61 may be implemented in hardware in the form of at least one of digital signal processing (DSP), field-programmable gate array (FPGA), and programmable logic array (PLA). The processor 61 may also include a main processor and a coprocessor. The main processor is used for processing data in a wake-up state, and is also called a central processing unit (CPU). The coprocessor is a low-power consumption processor used for processing data in a standby state. In some embodiments, the processor 61 may be integrated with a graphics processing unit (GPU). the GPU is used for rendering and drawing the content that needs to be displayed by the display screen. In some embodiments, the processor 61 may also include an artificial intelligence (AI) processor used for processing calculation operations related to machine learning.

The memory 60 may include one or more computer-readable storage medium, which may be non-transitory. The memory 60 may also include a high-speed random access memory, and a non-volatile memory, such as one or more magnetic disk storage apparatuses, and flash memory storage apparatuses. In the present embodiment, the memory 60 is at least used for storing the following computer program 601. After the computer program is loaded and executed by the processor 61, the relevant steps of the image recognition method disclosed in any of the above embodiments may be realized. In addition, the resources stored in the memory 60 may also include an operating system 602 and data 603, etc. The storage may be transient storage or permanent storage. The operating system 602 may include Windows, Unix, Linux, etc. Data 603 may include, but is not limited to, data corresponding to test results, etc.

In some embodiments, the image recognition device may further include a display screen 62, an input and output interface 63, a communication interface 64, a power supply 65, and a communication bus 66.

A person skilled in the art may understand that the structure shown in FIG. 6 does not constitute a limitation to the image recognition device, and the device may include more or fewer components than those shown in the figure, for example, may also include a sensor 67.

The functions of each functional module of the image recognition device provided by the embodiment of the present disclosure may be implemented by the method in the above-described method embodiment, and the specific implementation process of the functions may be referred to the relevant description of the above-described method embodiment, and will not be described in detail herein.

Therefore, the embodiment of the present disclosure effectively improves the efficiency of image recognition and reduces the calculation resources consumed in the image recognition process.

It may be understood that when the image recognition method in the above embodiment is implemented in the form of a software functional unit and sold or used as an independent product, it may be stored in the computer-readable storage medium. Based on such understanding, the technical solution of the present disclosure may be essentially, or the part of the present disclosure which contributes to the prior art or all or part of the technical solution may be embodied in the form of a software product, and the computer software product is stored in the storage medium, and performs all or part of the steps of the methods described in various embodiments of the present disclosure. The above-mentioned storage medium includes: a USB flash disk, a mobile hard disk, a read-only memory (ROM), a random access Memory (RAM), an electrically erasable programmable (ROM), a register, a hard disk, a removable disk, a compact disc read-only memory (CD-ROM), a diskette or an optical disk and the like which may store program codes.

Based on this, the embodiments of the present disclosure also provide the computer-readable storage medium storing an image recognition program. When the image recognition program is executed by the processor, the steps of the image recognition method as described in any of the embodiments above are realized.

The functions of each functional module of the computer-readable storage medium provided by the embodiments of the present disclosure may be implemented by the method in the above-mentioned method embodiments, and the specific implementation process of the functions may be referred to the relevant description of the above-mentioned method embodiments and will not be described in detail herein.

Therefore, the embodiment of the present disclosure effectively improves the efficiency of image recognition and reduces the calculation resources consumed in the image recognition process.

Furthermore, it needs to be stated that the image recognition device of the present disclosure may be deployed in a software platform of a neural network acceleration application based on an FPGA 15 or an AI acceleration chip, realizes the structured compression pruning in the forward reasoning process of the neural network without additional fine tuning steps, and the simplified compression process of the device may reduce the calculated amount and time delay of the compression process itself, which is conducive to the deployment of the neural network compression technology, and further promotes the implementation and promotion of FPGA-based deep learning in resource-constrained scenarios such as edge calculation.

In this specification, each embodiment is described in a progressive manner. Each embodiment focuses on the differences with other embodiments. The same or similar parts of each embodiment may be referred to each other. For the device disclosed in the embodiment, since it corresponds to the method disclosed in the embodiment, the description is relatively simple. Please refer to the description of the method section for details.

Professionals may further realize that the units and algorithm steps of each example described in combination with the embodiments disclosed herein may be implemented in electronic hardware, computer software, or a combination of the two. In order to clearly explain the interchangeability of hardware and software, the composition and steps of each example have been generally described in the above description according to their functions. Whether these functions are implemented in hardware or software depends on the specific application and design constraints of the technical solution. Professionals and technicians may use different methods to realize the described functions for each specific application, but such implementation should not be considered beyond the scope of the present disclosure.

The image recognition method, device and computer-readable storage medium provided in the present disclosure are described in detail above. In this specification, specific examples are used to explain the principle and implementation mode of the present disclosure. The above examples are only used to help understand the method and core idea of the present disclosure. It should be pointed out that for ordinary technicians in the technical field, on the premise of not departing from the principle of the present disclosure, a number of improvements and modifications may be made to the present disclosure, and these improvements and modifications also fall within the protection scope of the claims of the present disclosure.

The invention claimed is:

1. An image recognition method, comprising:
inputting a sample image data set into an original neural network model in advance; for each convolution layer of the original neural network model, by taking a feature map of the sample image data set at a current layer as a reconstruction target and using a kernel set construction method, acquiring updated weight values of a convolution kernel, calculating an input channel combination with a minimum reconstruction error and clipping redundant input channels, which serve as a compression result of the current layer; splicing the compression result of each convolution layer to generate an image recognition model; and inputting an acquired image to be recognized into the image recognition model to obtain an image recognition result of the image to be recognized;

wherein the calculating an input channel combination with a minimum reconstruction error and clipping redundant input channels comprises:

determining a probability that each input channel of the current layer is selected according to the updated weight value of the convolution kernel of the current layer, and forming the probability that each input channel is selected into a hit probability set;

calculating the input channel combination with the minimum output feature map reconstruction error based on the hit probability set, and removing non-selected input channels according to the input channel combination; and calculating an output feature map of the compressed convolution kernel, using a convolution result of the compressed convolution kernel of the current layer and the sample image data set as input data of a next convolution layer of the current layer.

2. The image recognition method according to claim 1, wherein the by taking a feature map of the sample image data set at the current layer as a reconstruction target and using a kernel set construction method, acquiring updated weight values of a convolution kernel comprises:

determining importance of each input channel of the current layer according to a feature map of each sample data in the sample image data set at each input channel of the current layer;

setting an importance weighting coefficient for each input channel according to the importance of each input channel;

determining a sampling probability of each input channel by calculating a weighted importance function of each input channel and a sum function;

performing multiple rounds of sampling on a corresponding input channel according to the sampling probability of each input channel, performing multiple sampling on an input channel set of the current layer per round according to the sampling probability to obtain a kernel set, calculating and accumulating feature map reconstruction errors corresponding to a channel kernel set, and obtaining an updated value of a convolution kernel weight of the current layer by calculating an optimization function that minimizes feature map reconstruction errors.

3. The image recognition method according to claim 2, wherein the determining a sampling probability of each input channel by calculating a weighted importance function of each input channel and a sum function comprises:

invoking a pre-stored importance function relationship formula to calculate the weighted importance function of each input channel, wherein the importance function relationship formula is:

$s_i(x) = w_i(x) \cdot g_i(x)$ the sampling probability $p_i$ of an i-th input channel is expressed as $p_i = s_i(x)/t$;

where $s_i(x)$ represents the weighted importance function of the i-th input channel, $w_i(x)$ represents the importance weighting coefficient of the i-th input channel, and $g_i(x)$ represents an initial importance function of the i-th input channel;

$$g_i(x) = \max_{x \in X}(\|x_i\|_F^2) / \frac{1}{m_{l-1}} \sum_{i=1}^{m_{l-1}} \max_{x \in X}(\|x_i\|_F^2),$$

$$w_i(x) = \begin{cases} 1/(a_l + 1), & i \le a_l \\ 1/(a_l + 1)(m_{l-1} - a_1), & a_l \le i \le m_{l-1} \end{cases},$$

$$\sum_{i=1}^{m_{l-1}} w_i(x) = 1, \text{ where } \max_{x \in X}\|x_i\|_F^2$$

represents a maximum value of Frobenius norms of the feature map $x_i$ of each sample data in the sample image data set X in the i-th input channel, $m_{l-1}$ represents a total number of output channels of a (l−1)-th convolution layer of the original neural network model, $$\frac{1}{m_{l-1}} \sum_{i=1}^{m_{l-1}} \max_{x \in X}(\|x_i\|_F^2)$$

represents a mean value of the maximum values of the Frobenius norms of the feature maps of all the input channels, $a_l$ represents a number of compressed input channels to be achieved by a l-th convolution layer target of the original neural network model, and t represents the sum function; and $t = \sum_{i=1}^{m_{l-1}} s_i(x)$.

4. The image recognition method according to claim 3, wherein the obtaining an updated value of a convolution kernel weight of the current layer by calculating an optimization function that minimizes feature map reconstruction errors comprises:

invoking a pre-stored weight value updating relationship formula to obtain the updated value of the convolution kernel weight of the current layer, wherein the weight value updating relationship formula is expressed as:

$\min \sum_{k=1}^{K} 1/R \sum_{r=1}^{R} \|Y_k - \sum_{x_i \in S} x_i * W_{ik}^*\|_F^2$;

where $Y_k$ represents an output feature map of an uncompressed convolution kernel at a k-th output channel, K represents a total number of the output channels of the convolution kernel of the current layer, $\sum_{k=1}^{K}(\cdot)$ represents a respective calculation of feature map reconstruction errors for the K output channels of the convolution kernel and a summarization of the errors; $\sum_{r=1}^{R}(\cdot)$ represents R rounds of independent sampling of the input channel combination of the input sample image data set and an accumulation of the feature map reconstruction errors of each sampling result, $\|\cdot\|_F^2$ represents the Frobenius norm, $W_{ik}^*$ represents an updated value of a weight tensor of the convolution kernel of the current layer at the i-th input channel and the k-th output channel, and serves as a solution target of the convolution kernel weight value estimation operation based on the kernel set, S represents a kernel set composed of a input channels sampled from C input channels inputting the sample image data set; $\sum_{x_i \in S} x_i * W_{ik}^*$ represents the sum of output feature maps of feature maps $x_i$ of all input channels in the kernel set S at an output channel corresponding to the convolution kernel; and * represents a convolution operation.

5. The image recognition method according to claim 3, wherein the initial importance function $g_i(x)$ of the input channel is calculated according to the sample image data set, and the sample image data set is input data of a l-th layer.

6. The image recognition method according to claim 3, wherein the setting an importance weighting coefficient for each input channel according to the importance of each input channel comprises:
calculating a $L_1$ norm $\|W_i\|_1$ of the parameter tensor $W_i$ of the convolution kernel of the l-th layer in different input channels; and
according to a descending sort of values of $|W_i\|_1$, assigning relatively large weight values $w_i(x)=1/(a_l+1)$ to first $a_l$ sorted input channels, and assigning relatively small weight values $w_i(x)=1/(a_l+1)$ $(m_{l-1}-a_l)$ to other input channels.

7. The image recognition method according to claim 3, wherein the importance function $s_i(x)$ is capable of ensuring $$\frac{m_{l-1}}{(a_l+1)(m_{l-1}-a_l)} \leq t \leq \frac{m_{l-1}}{a_l+1},$$

and when $a_l=m_{l-1}-1$, equal signs hold.

8. The image recognition method according to claim 1, wherein the calculating the input channel combination with the minimum output feature map reconstruction error based on the hit probability set comprises:
invoking a pre-stored optimization function relationship formula to calculate an input channel combination $\gamma$ with the minimum output feature map reconstruction error, wherein the optimization function relationship formula is expressed as:

$$\arg\min_{\gamma} \left\| Y - \sum_{k=1}^{K}\sum_{i=1}^{C} \gamma_i X_i W_{ik}^* \right\|_F^2 + (1-q)\gamma;$$

where Y represents the output feature map of the original neural network model at the current layer, K represents a total number of the output channels of the convolution kernel at the current layer, $\gamma_i$ represents whether an i-th channel is selected, the value of $\gamma_i$ is 0 or 1, $\gamma=\{\gamma_i|1\leq i\leq C\}$ represents the best sampling result of a input channels sampled from C input channels, and satisfies the condition $\|\gamma\|_0=a$, and $X_i$ represents the feature map of the sample image data set at an i-th input channel of the current layer; $W_{ik}^*$ represents an updated value of a weight tensor of the convolution kernel of the current layer at the i-th input channel and a k-th output channel; $\|\cdot\|_F^2$ represents a Frobenius norm; $(1-q)\gamma$ represents the addition of a vector constructed by the sampling probability of each input channel as a penalty factor to a penalty term in an optimization objective function; and q represents the hit probability set.

9. The image recognition method according to claim 1, wherein the determining the probability that each input channel of the current layer is selected according to the updated weight value of the convolution kernel of the current layer comprises:
invoking a pre-stored selection probability relationship formula to calculate the probability that each input channel at the current layer is selected, wherein the selection probability relationship formula is expressed as:

$$q_i=(w_i(x)\cdot f_i(x))/\Sigma_{i=1}^{m_{l-1}}(w_i(x)\cdot f_i(x));$$

where $$f_i(x) = \max_{x \in X}\left(\left\|x_i * \sum_{k=1}^{K} W_{ik}^*\right\|_F^2\right) / \frac{1}{n_l}\sum_{i=1}^{n_l}\max_{x \in X}\left(\left\|x_i * \sum_{k=1}^{K} W_{ik}^*\right\|_F^2\right); w_i(x)$$

represents an importance weighting coefficient of an i-th input channel; $m_{l-1}$ represents total numbers of output channels of a (l–1)-th convolution layer of the original neural network model; X represents the sample image data set; $x_i$ represents the feature map of each sample data in the sample image data set in the i-th input channel; K represents the total number of the output channels of the convolution kernel of the current layer; $W_{ik}^*$ represents an updated value of a weight tensor of the convolution kernel of the current layer in the i-th input channel and a k-th output channel; $\|\cdot\|_F^2$ represents a Frobenius norm; and $n_l$ represents a total number of the input channels of the original neural network model in a l-th layer.

10. The image recognition method according to claim 1, wherein the original neural network model is at least one of a supervised learning network type, an unsupervised learning network type, an associative learning network type, or an optimized application network type.

11. The image recognition method according to claim 1, wherein the image recognition model is configured for performing an image classification and recognition operation, and the method further comprises:
by the image recognition model, matching the image to be recognized with a suitable label, and outputting a type of the label as the image recognition result.

12. An image recognition device, comprising a processor, when executing a computer program stored in a memory, causes the processor to:
input a sample image data set into an original neural network model, for each convolution layer of the original neural network model, by taking a feature map of the sample image data set at a current layer as a reconstruction target and using a kernel set construction method, acquire updated weight values of a convolution kernel, calculate an input channel combination with a minimum reconstruction error and clip redundant input channels, which serve as a compression result of the current layer, and splice the compression result of each convolution layer to generate an image recognition model; and
input an acquired image to be recognized into the image recognition model to obtain an image recognition result of the image to be recognized;
wherein the calculate an input channel combination with a minimum reconstruction error and clip redundant input channels comprises:
determining a probability that each input channel of the current layer is selected according to the updated weight value of the convolution kernel of the current layer, and forming the probability that each input channel is selected into a hit probability set;
calculating the input channel combination with the minimum output feature map reconstruction error based on the hit probability set, and removing non-selected input channels according to the input channel combination; and
calculating an output feature map of the compressed convolution kernel, using a convolution result of the compressed convolution kernel of the current layer and the sample image data set as input data of a next convolution layer of the current layer.

13. The image recognition device according to claim 12, wherein the by taking a feature map of the sample image data set at the current layer as a reconstruction target and using a kernel set construction method, acquire updated weight values of a convolution kernel comprises:

determining importance of each input channel of the current layer according to a feature map of each sample data in the sample image data set at each input channel of the current layer;

setting an importance weighting coefficient for each input channel according to the importance of each input channel;

determining a sampling probability of each input channel by calculating a weighted importance function of each input channel and a sum function;

performing multiple rounds of sampling on a corresponding input channel according to the sampling probability of each input channel, performing multiple sampling on an input channel set of the current layer per round according to the sampling probability to obtain a kernel set, calculating and accumulating feature map reconstruction errors corresponding to a channel kernel set, and obtaining an updated value of a convolution kernel weight of the current layer by calculating an optimization function that minimizes feature map reconstruction errors.

14. The image recognition device according to claim 13, wherein the determining a sampling probability of each input channel by calculating a weighted importance function of each input channel and a sum function comprises:

invoking a pre-stored importance function relationship formula to calculate the weighted importance function of each input channel, wherein the importance function relationship formula is:

$s_i(x) = w_i(x) \cdot g_i(x)$ the sampling probability $p_i$ of an i-th input channel is expressed as $p_i = s_i(x)/t$;

where $s_i(x)$ represents the weighted importance function of the i-th input channel, $w_i(x)$ represents the importance weighting coefficient of the i-th input channel, and $g_i(x)$ represents an initial importance function of the i-th input channel;

$$g_i(x) = \max_{x \in X}(\|x_i\|_F^2) / \frac{1}{m_{l-1}} \sum_{i=1}^{m_{l-1}} \max_{x \in X}(\|x_i\|_F^2),$$

$$w_i(x) = \begin{cases} 1/(a_l + 1), & i \leq a_l \\ 1/(a_l + 1)(m_{l-1} - a_1), & a_l \leq i \leq m_{l-1} \end{cases},$$

$$\sum_{i=1}^{m_{l-1}} w_i(x) = 1, \text{ where } \max_{x \in X}\|x_i\|_F^2$$

represents a maximum value of Frobenius norms of the feature map $x_i$ of each sample data in the sample image data set X in the i-th input channel, $m_{l-1}$ represents a total number of output channels of a (l−1)-th convolution layer of the original neural network model, $$\frac{1}{m_{l-1}} \sum_{i=1}^{m_{l-1}} \max_{x \in X}(\|x_i\|_F^2)$$

represents a mean value of the maximum values of the Frobenius norms of the feature maps of all the input channels, $a_l$ represents a number of compressed input channels to be achieved by a l-th convolution layer target of the original neural network model, and t represents the sum function; and $t = \sum_{i=1}^{m_{l-1}} s_i(x)$.

15. A non-transitory computer-readable storage medium, storing an image recognition program thereon, when executed by a processor, causes the processor to:

input a sample image data set into an original neural network model, for each convolution layer of the original neural network model, by taking a feature map of the sample image data set at a current layer as a reconstruction target and using a kernel set construction method, acquire updated weight values of a convolution kernel, calculate an input channel combination with a minimum reconstruction error and clip redundant input channels, which serve as a compression result of the current layer, and splice the compression result of each convolution layer to generate an image recognition model; and input an acquired image to be recognized into the image recognition model to obtain an image recognition result of the image to be recognized;

wherein the calculate an input channel combination with a minimum reconstruction error and clip redundant input channels comprises:

determining a probability that each input channel of the current layer is selected according to the updated weight value of the convolution kernel of the current layer, and forming the probability that each input channel is selected into a hit probability set;

calculating the input channel combination with the minimum output feature map reconstruction error based on the hit probability set, and removing non-selected input channels according to the input channel combination; and calculating an output feature map of the compressed convolution kernel, using a convolution result of the compressed convolution kernel of the current layer and the sample image data set as input data of a next convolution layer of the current layer.

16. The non-transitory computer-readable storage medium according to claim 15, wherein the by taking a feature map of the sample image data set at the current layer as a reconstruction target and using a kernel set construction method, acquire updated weight values of a convolution kernel comprises:

determining importance of each input channel of the current layer according to a feature map of each sample data in the sample image data set at each input channel of the current layer;

setting an importance weighting coefficient for each input channel according to the importance of each input channel;

determining a sampling probability of each input channel by calculating a weighted importance function of each input channel and a sum function;

performing multiple rounds of sampling on a corresponding input channel according to the sampling probability of each input channel, performing multiple sampling on an input channel set of the current layer per round according to the sampling probability to obtain a kernel set, calculating and accumulating feature map reconstruction errors corresponding to a channel kernel set, and obtaining an updated value of a convolution kernel weight of the current layer by calculating an optimization function that minimizes feature map reconstruction errors.

17. The non-transitory computer-readable storage medium according to claim 16, wherein the determining a sampling probability of each input channel by calculating a weighted importance function of each input channel and a sum function comprises:
invoking a pre-stored importance function relationship formula to calculate the weighted importance function of each input channel, wherein the importance function relationship formula is:

$s_i(x) = w_i(x) \cdot g_i(x)$ the sampling probability $p_i$ of an i-th input channel is expressed as $p_i = s_i(x)/t$;

where $s_i(x)$ represents the weighted importance function of the i-th input channel, $w_i(x)$ represents the importance weighting coefficient of the i-th input channel, and $g_i(x)$ represents an initial importance function of the i-th input channel;

$$g_i(x) = \max_{x \in X}(\|x_i\|_F^2) / \frac{1}{m_{l-1}} \sum_{i=1}^{m_{l-1}} \max_{x \in X}(\|x_i\|_F^2),$$

$$w_i(x) = \begin{cases} 1/(a_l + 1), & i \le a_l \\ 1/(a_l + 1)(m_{l-1} - a_1), & a_l \le i \le m_{l-1} \end{cases},$$

$$\sum_{i=1}^{m_{l-1}} w_i(x) = 1, \text{ where } \max_{x \in X}\|x_i\|_F^2$$

represents a maximum value of Frobenius norms of the feature map $x_i$ of each sample data in the sample image data set X in the i-th input channel, $m_{l-1}$ represents a total number of output channels of a (l−1)-th convolution layer of the original neural network model, $$\frac{1}{m_{l-1}} \sum_{i=1}^{m_{l-1}} \max_{x \in X}(\|x_i\|_F^2)$$

represents a mean value of the maximum values of the Frobenius norms of the feature maps of all the input channels, $a_l$ represents a number of compressed input channels to be achieved by a l-th convolution layer target of the original neural network model, and t represents the sum function; and $t = \Sigma_{i=1}^{m_{l-1}} s_i(x)$.

* * * * *